(12) United States Patent
Unger et al.

(10) Patent No.: US 7,335,343 B2
(45) Date of Patent: Feb. 26, 2008

(54) PREPARATION OF IRON PENTACARBONYL

(75) Inventors: Gabriele Unger, Brüssel (DE); Hendrik Schönfelder, Mannheim (DE); Otto Watzenberger, Mannheim (DE); Hans-Josef Sterzel, Dannstadt-Schauernheim (DE); Klaus Kühling, Ellerstadt (DE)

(73) Assignee: Basf Aktiengesellschaft, Ludwigshafen (DE)

( * ) Notice: Subject to any disclaimer, the term of this patent is extended or adjusted under 35 U.S.C. 154(b) by 452 days.

(21) Appl. No.: 10/992,676

(22) Filed: Nov. 22, 2004

(65) Prior Publication Data

US 2005/0129605 A1    Jun. 16, 2005

(30) Foreign Application Priority Data

Dec. 10, 2003    (DE) ................. 103 58 074

(51) Int. Cl.
*C01G 1/04*    (2006.01)
(52) U.S. Cl. ...................................... 423/417
(58) Field of Classification Search ............... 423/417, 423/138
See application file for complete search history.

(56) References Cited

U.S. PATENT DOCUMENTS 2,086,881 A * 7/1937 Schlecht et al. ............ 423/154
3,672,873 A * 6/1972 Huggins ..................... 75/430
3,785,802 A   1/1974 Roberti et al.
4,045,541 A * 8/1977 Mercer ....................... 423/417

FOREIGN PATENT DOCUMENTS

| DE | 634 283 | 8/1936 |
| DE | 935 007 | 11/1955 |
| DE | 809 310 | 2/1959 |
| DE | 17 606 | 9/1959 |
| GB | 327 956 | 4/1930 |
| GB | 438 893 | 11/1935 |
| GB | 2 717 985 | 9/1986 |
| IT | 728 074 | 12/1966 |

OTHER PUBLICATIONS

Z. Anorg. Allg. Chem. 262 (1950), pp. 15-24.
Z. Anorg. Allg. Chem. 372 (1970), pp. 162-170.
Z. Anorg. Allg. Chem. 296 (1958), pp. 91-103.
Die Chemie 55 (1942), pp. 7-11.
Sci. Rept. Res. Inst. Tohoku Univ. Serie A, 1 (1949), pp. 319-325.
Chim. Ind. (Milan) 49 (1967), pp. 347-354.
Ullmann's Encyclopedia of Industrial Chemistry, Sixth Ed., 2000, Electronic Release (WILEY-VCH Verlag GmbH, Weinheim), section "3.Iron Pentacarbonyl".

* cited by examiner

*Primary Examiner*—Wayne A. Langel
*Assistant Examiner*—James Fiorito
(74) *Attorney, Agent, or Firm*—Novak Druce + Quigg LLP

(57) ABSTRACT

Iron pentacarbonyl is prepared by reacting iron with carbon monoxide in suspension and in the presence of a mixture of alkali metal sulfide and sulfur as a catalyst.

10 Claims, No Drawings

PREPARATION OF IRON PENTACARBONYL

The present invention relates to a process for preparing iron carbonyl, especially iron pentacarbonyl.

In the context of this invention, iron carbonyl refers to compounds of iron and carbon monoxide (CO) in which carbon monoxide ligands are coordinated to an iron atom or a plurality of iron atoms. The industrially most important iron carbonyl which is preferred in the context of this invention is iron pentacarbonyl $Fe(CO)_5$. Iron pentacarbonyl is used industrially as a raw material for preparing fine iron powder (known as carbonyl iron powder) by thermal decomposition with the exclusion of air or for preparing fine iron oxide powders (some such products are referred to as "iron red") by combustion. The quantitatively most significant applications of carbonyl iron powder are powder metallurgy and the production of magnetic cores for electronic components, and the fine iron oxide powders are usually used as color or magnetic pigments. The higher iron carbonyls which are likewise known, $Fe_2(CO)_9$ and $Fe_3(CO)_{12}$, are formed as by-products to a slight extent in the synthesis of iron pentacarbonyl, but play no role in industry, so that iron pentacarbonyl is often also referred to in simplified form just as iron carbonyl, and when reference is made only to iron carbonyl, it is usually iron pentacarbonyl that is meant.

A general review of the preparation, properties and uses of iron carbonyl, especially iron pentacarbonyl, is given by G. Friedrich, F. L. Ebenhöch and B. Kühborth in Ullmann's Encyclopedia of Industrial Chemistry, Sixth Edition, 2000 Electronic Release (WILEY-VCH Verlag GmbH, Weinheim), Section "3. Iron Pentacarbonyl" of the text under the heading "Iron Compounds".

Industrially, iron carbonyl is typically prepared by reacting carbon monoxide with solid reactive iron, for example iron sponge, at a pressure of from 5 to 30 MPa, typically 20 MPa (200 bar) and from 150 to 200° C. To this end, carbon monoxide is passed over the iron in a reactor, the iron carbonyl which forms is removed in a condenser from the gas leaving the reactor and decompressed to the pressure in the workup section of the plant. The process is typically carried out in semibatch mode (semicontinuous); iron is thus initially charged in the reactor and carbon monoxide is passed through the reactor until the initially charged iron has been consumed, whereupon the reactor is opened and further iron is introduced. Depending on the precise composition of the iron used, the thus prepared iron carbonyl contains impurities resulting from other volatile carbonyls, for example nickel carbonyls, chromium carbonyls, molybdenum carbonyls and/or tungsten carbonyls, and also other impurities, for example lubricant oil, sulfur compounds or water. The iron carbonyl is typically freed of such impurities by single or multiple distillation.

Often, sulfur-containing iron in the form of granules having a sulfur content of, for example, 1-4% by weight is also used instead of iron sponge, as taught, for example, in DE 634 283 C1, because this sulfur addition has a reaction-accelerating effect. Equally, a corresponding mixture of sulfur-free and sulfur-containing iron of the desired net composition may be used. In Z. Anorg. Allg. Chem. 262 (1950) 15-24, W. Hieber and O. Geisenberger report on their investigations of this effect of sulfur, which they attribute to intermediate formation of iron carbonyl sulfides and their disproportionation to form iron carbonyl, and on the formation of the carbonyl sulfide $Fe_3S_2(CO)_8$ from hydrogen sulfide, carbon monoxide and iron. G. Heinicke, N. Bock and H. Harenz, Z. Anorg. Allg. Chem. 372 (1970), 162-170 and also W. Hieber and J. Gruber, Z. Anorg. Allg. Chem. 296 (1958) 91-103 also discuss $Fe_2S_2(CO)_6$ and $Fe_3S_2(CO)_9$ as catalytically active intermediates formed in situ.

One of the great disadvantages of the industrial process is the semibatchwise operation which makes it necessary to regularly open the reactor to replenish iron. Owing to the high toxicity of iron carbonyl and the need to exclude oxygen, prolonged flushings of the reactor with inert gas are necessary. This process version reduces the space-time yield achievable in a reactor considerably and is economically unsatisfactory. Attempts have therefore already been made in the past to be able to introduce iron continuously into a reactor under the conditions of the iron carbonyl synthesis, for instance as a fluidized bed process according to the teaching of U.S. Pat. No. 3,785,802 or as taught by C. Dofour-Berte and E. Pasero in Chim. Ind. (Milan) 49 (1967), p. 347-354, or, avoiding the problem of continuously introducing solids into pressure reactors, to establish an alternative synthetic route starting from dissolved iron salts, as disclosed in IT 728 074. In a review article in Die Chemie 55 (1942), p. 7-11, W. Hieber mentions similar experiments for preparing nickel carbonyl from carbon monoxide and nickel sulfide in alkaline suspension, or by reacting carbon monoxide with nickel salts of organic thio acids. However, it has hitherto not been possible to commercially utilize any of these approaches, which might be attributable overall to unsatisfactory yields.

One means of circumventing the problem is to use pumpable suspensions of iron, which can in principle be introduced into pressure reactors continuously in a simpler manner than solids. In Sci. Rept. Res. Inst. Tohoku Univ., Series A, 1 (1949) 319-325, T. Okamura, H. Kozima and Y. Masuda report on their studies of the preparation of iron carbonyl with the common process in semibatchwise operation, but mention that the use of suspensions in their case met with difficulties in practice. In contrast, DD 17 606 discloses a process for continuously reacting solid suspensions with gases in a bubble column reactor equipped with sieve trays, which is also taught there for the preparation of iron carbonyl from a suspension of iron powder in petroleum and carbon monoxide and is applied practically in an example.

It is an object of the present invention to find an improved process for preparing iron pentacarbonyl, which can be carried out with higher space-time yield and under milder conditions than the industrially customary process.

Accordingly, a process has been found for preparing iron pentacarbonyl by reacting iron with carbon monoxide in suspension and in the presence of a sulfur catalyst, which comprises using a mixture of alkali metal sulfide and sulfur as the catalyst.

The process according to the invention proceeds under milder conditions than the common industrial processes and allows higher space-time yields.

The catalyst used in the process according to the invention is a mixture of alkali metal sulfide and sulfur.

The alkali metal sulfide used may be any alkali metal sulfide or mixture of alkali metal sulfides. Preference is given to using sodium sulfide and/or potassium sulfide, and particular preference to sodium sulfide.

Alkali metal sulfide and sulfur are mixed in a molar ratio of sulfidic to elemental sulfur which is generally at least 1:1 and preferably at least 1:2, and also generally at most 1:10 and preferably at most 1:5.

The sulfur used may be any modification of sulfur. Preference is given to using yellow sulfur, i.e. $S_8$.

The process according to the invention for preparing iron pentacarbonyl is a suspension process. To this end, iron powder is initially charged in suspension and reacted with carbon monoxide in the presence of the catalyst. The catalyst, the alkali metal sulfide-sulfur mixture, is generally used in an amount of at least 0.5 gram per kilogram of metallic iron used for the reaction with carbon monoxide, preferably in an amount of at least 1 g/kg and more preferably at least 2 g/kg, and also generally at most 30 g/kg, preferably at most 25 g/kg and more preferably at most 20 g/kg. Higher amounts of catalyst are usually uneconomic.

To carry out the process according to the invention, iron is initially charged in the form of a suspension to which the catalyst is added. A suitable suspension agent is any suspension agent which is sufficiently inert toward the reaction partners. Examples of inert suspension agents are hydrocarbons or hydrocarbon mixtures such as pentane, hexane, cyclohexane, benzine, petroleum, benzene, toluene or xylene. A preferred suspension agent is iron pentacarbonyl.

Iron is used in a form which is suspendable. To this end, the iron particles should not be too large, since a very high stirrer output is otherwise required. Suitable are, for example, iron granules or iron powder. A suitable average particle size of the iron is generally at most 10 mm, preferably at most 8 mm and more preferably at most 6 mm.

The suspension is stirred unless the iron used is so fine that it sediments to a sufficiently small extent.

This suspension is admixed with carbon monoxide by building up carbon monoxide pressure. The reaction is generally carried out at a temperature of at least 100° C., preferably at least 130° C. and more preferably at least 140° C., and also generally at most 200° C., preferably at most 170° C. and more preferably at most 160° C. An example of a very suitable temperature is 150° C. The carbon monoxide pressure applied is generally at least 5 MPa (50 bar), preferably at least 10 MPa (100 bar) and more preferably at least 12 MPa (120 bar), and also generally at most 25 MPa (250 bar), preferably at most 20 MPa (200 bar) and more preferably at most 18 MPa (180 bar). An example of a very suitable pressure is 15 MPa (150 bar). When inert gases are present in addition to carbon monoxide, these values are set as the partial carbon monoxide pressure. Although it is possible to dilute the carbon monoxide with inert gases, the achievable space-time yield falls. Although higher pressures than those mentioned above are likewise possible, they bring no industrially significant improvement.

The process may be carried out in batchwise operation (i.e. discontinuously), in semibatchwise operation (i.e. semi-continuously) or continuously.

In batchwise operation, the iron, the catalyst and the suspension agent are initially charged and carbon monoxide is injected. On completion of the reaction, the mixture is decompressed, the iron pentacarbonyl formed and the suspension agent are freed of solid residues by filtration, the suspension agent and the iron pentacarbonyl are separated from each other, for example by distillation, and the iron carbonyl is worked up as usual. The separation of the iron carbonyl from the suspension agent of course becomes unnecessary when iron carbonyl is used as the suspension agent.

In the case of semibatchwise operation, iron, the catalyst and the suspension agent are initially charged and the system is flowed through with carbon monoxide until the reaction comes to a standstill for the lack of iron to react. The gas stream leaving the reactor comprises, in addition to carbon monoxide, the iron pentacarbonyl formed and possibly also suspension agent depending on its vapor pressure. Suspension agent and iron carbonyl are condensed out and separated, for example by distillation, and the product is worked up as usual.

However, the process according to the invention may also be carried out continuously. To this end, a pumpable suspension of iron in suspension agent is conveniently prepared and introduced continuously into the reactor. The catalyst is either added to this suspension or introduced directly into the reactor. Carbon monoxide is introduced into the reactor. The amounts of iron and carbon monoxide introduced into the reactor may be adjusted in such a way that they react fully with one another in the reactor, but partial conversion based on carbon monoxide or else based on iron may also be attained. A gas stream drawn off from the reactor, like the gas stream obtained in semibatchwise operation, comprises carbon monoxide, iron pentacarbonyl and suspension agent, and is worked up in the same way. A liquid stream drawn off from the reactor, like the crude product obtained in batchwise operation, comprises iron pentacarbonyl, suspension agent and unreacted iron and is worked up in the same way.

Unconverted carbon monoxide and unconverted iron used can be again anew.

EXAMPLES

Experimental Procedure

The reactions were carried out in a stirred 300 ml autoclave which was charged with 50 g of iron powder (M 40 from Höganäs AB, Höganäs, Sweden, sulfur content 0.011% by weight) and 50 ml (72 g) of iron pentacarbonyl and also a mixture of sodium sulfide $Na_2S \cdot xH_2O$ (approx. 35% by weight) and yellow sulfur as a catalyst. Once the autoclave had been sealed, 5 MPa (50 bar) of CO were injected and the autoclave was heated to 150° C. On attainment of this temperature, 150 bar of CO were injected and the autoclave was connected via an automatically controllable valve to a storage vessel for CO (a CO-filled autoclave of volume 2.5 l under an initial pressure of 280 bar). The CO pressure in the 300 ml autoclave was kept constant by feeding carbon monoxide from the storage vessel by virtue of the automatic valve control in the event of a fall in pressure. The amount of CO consumed within one hour after attainment of the reaction temperature was determined and then the conversion achieved up to this point and the space-time yield achieved up to then were calculated.

The experimental results of Examples 1-6 are summarized in the table which follows.

The experimental results of examples 1-6 are summarized in the table which follows.

Comparative examples C1 and C2 show that the omission of one of the catalyst components, sulfur or sulfide, leads to worsened space-time yields, and comparative examples C1 to C4 with addition of iron sulfide and sulfur, similar to the use of sulfurized iron granules in the common industrial process (which is not, however, carried out in a suspension), showed considerably lower conversions and space-time yields.

| Ex. # | $Na_2S \cdot x H_2O$ [mg] | $S_8$ [mg] | Conversion [mol %] | Space-time yield [kg $Fe(CO)_5 m^{-3} h^{-1}$] |
|---|---|---|---|---|
| 1 | 70 | 30 | 46 | 1165 |
| 2 | 210 | 90 | 59 | 1495 |
| 3 | 420 | 180 | 101 | 2559 |
| 4 | 630 | 270 | 92 | 2330 |

-continued

| Ex. # | $Na_2S \cdot x\ H_2O$ [mg] | $S_8$ [mg] | Conversion [mol %] | Space-time yield [kg $Fe(CO)_5 m^{-3} h^{-1}$] |
|---|---|---|---|---|
| 5 | 120 | 180 | 5 | 127 |
| 6 | 420 | 80 | 56 | 1418 |
| C1 | 100 | 0 | 40 | 507 |
| C2 | 0 | 240 | 4 | 101 |
| C3 | 208 mg FeS | 180 | 5 | 127 |
| C4 | 130 mg $FeS_2$ | 70 | 7 | 177 |

The examples show that, using the process according to the invention, high conversions and space-time yields are achievable.

What is claimed is:

1. A process for preparing iron pentacarbonyl by reacting iron with carbon monoxide which comprises providing a suspension of iron particles in an inert suspension medium and reacting the suspended iron particles with the carbon monoxide in the presence of a mixture of alkali metal sulfide and sulfur as catalyst.

2. The process according to claim 1, wherein the catalyst is a mixture of sodium sulfide and sulfur.

3. The process according to claim 2, wherein the mixture of sodium sulfide and sulfur has a molar ratio of sulfidic to elemental sulfur in the range from 1:1 to 1:10.

4. The process according to claim 3, wherein the molar ratio of sulfidic to elemental sulfur is in the range from 1:2 to 1:5.

5. The process according to claim 1, wherein the reaction is carried out at a temperature of at least 100° C. and at most 200° C.

6. The process according to claim 5, wherein the reaction is carried out at a carbon monoxide pressure of at least 5 MPa (50 bar) and at most 25 MPa (250 bar).

7. The process according to claim 1, wherein the suspended iron particles are in form of suspended granules or powder.

8. The process according to claim 1, wherein the suspended iron particles have an average size of at most 10 mm.

9. The process according to claim 1, wherein the suspension agent is selected from the group consistung of hydrocarbons, hydrocarbon mixtures and iron pentacarbonyl.

10. The process according to claim 1, wherein the suspension agent is iron pentacarbonyl.

* * * * *

UNITED STATES PATENT AND TRADEMARK OFFICE
CERTIFICATE OF CORRECTION

PATENT NO.        : 7,335,343 B2                                    Page 1 of 1
APPLICATION NO.   : 10/992676
DATED             : February 26, 2008
INVENTOR(S)       : Unger et al.

It is certified that error appears in the above-identified patent and that said Letters Patent is hereby corrected as shown below:

On the Title Page of the patent, in subsection (75):
    "Gabriele Unger, Brüssel (DE);" should read --Gabriele Unger, Brüssel (BE)--

Signed and Sealed this

Seventeenth Day of June, 2008

JON W. DUDAS
*Director of the United States Patent and Trademark Office*